Patented July 20, 1926.

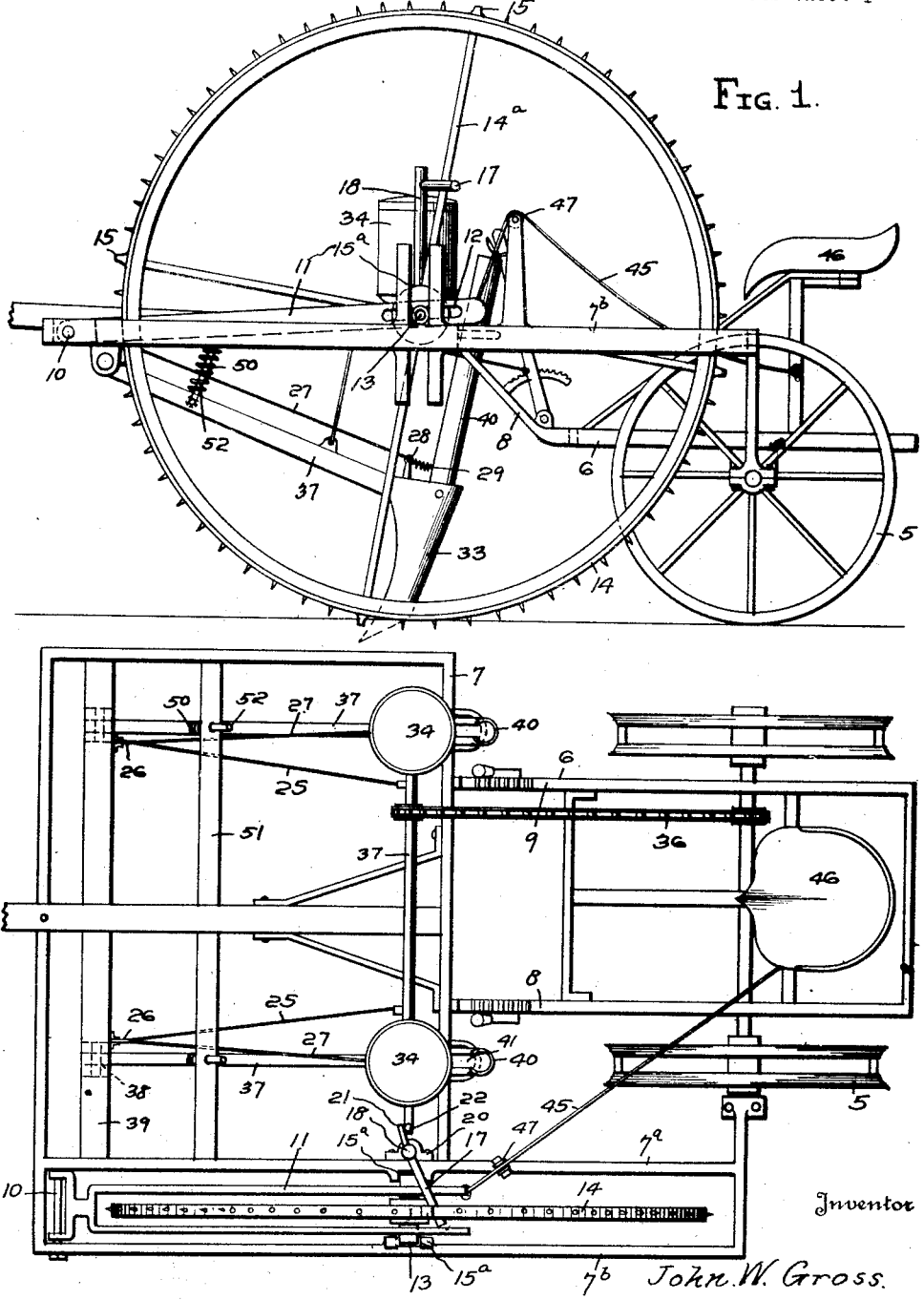

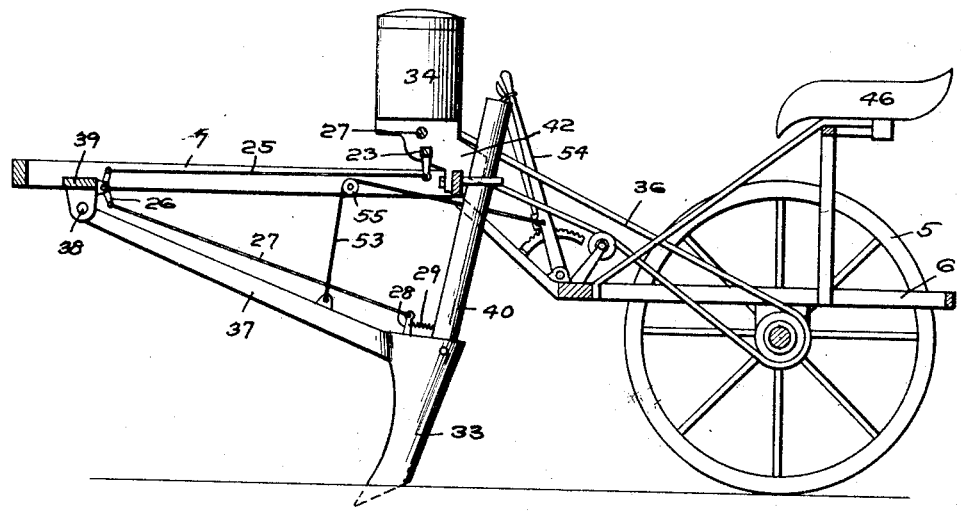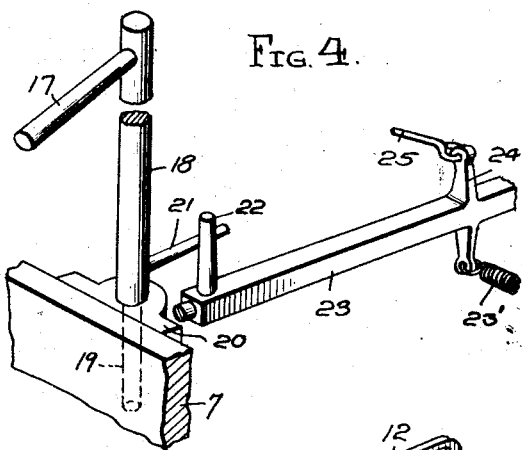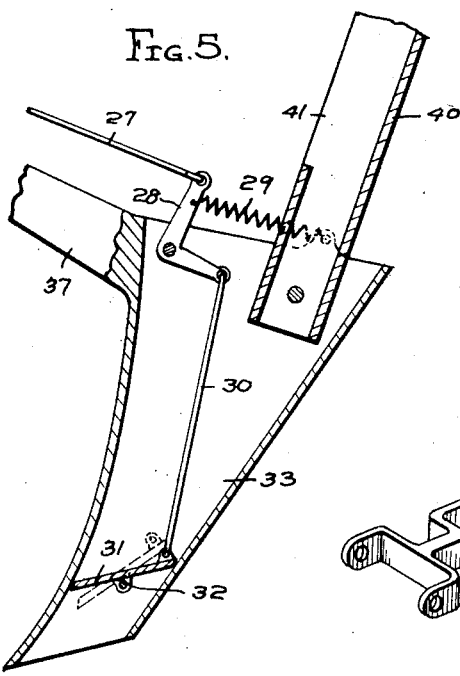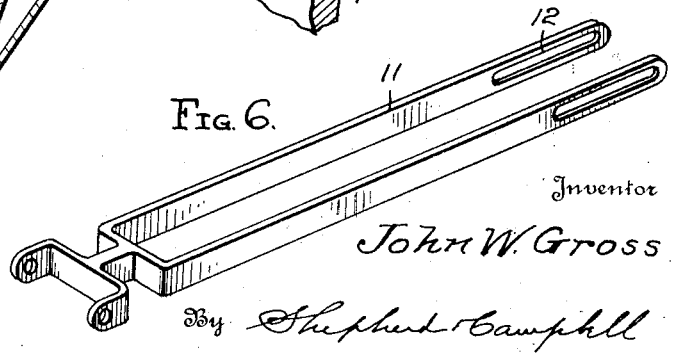

1,593,070

UNITED STATES PATENT OFFICE.

JOHN W. GROSS, OF UNION TOWNSHIP, AUGLAIZE COUNTY, OHIO.

CHECKROW CORN PLANTER.

Application filed May 25, 1925. Serial No. 32,804.

This invention relates to a check row corn planter and it has for its object to provide an improved device of this character which will be wholly self contained, so that the excessively long check row wires or chains may be dispensed with, while at the same time the rows may be suitably marked and the seed deposited at the proper points.

Further objects and advantages of the invention will be set forth in the detailed description which follows.

In the accompanying drawings:

Fig. 1 is a side elevation of a corn planter constructed in accordance with the invention.

Fig. 2 is a plan view thereof.

Fig. 3 is a vertical longitudinal sectional view.

Fig. 4 is a view of a trip mechanism hereinafter described.

Fig. 5 is a detailed sectional view of one of the hoes, and

Fig. 6 is a detailed perspective view of a vibrator yoke constituting a mounting for the check indicator wheel hereinafter described.

Like numerals designate corresponding parts throughout the several figures of the drawings.

In the drawings 5 designates the ground wheel and 6 the frame of an ordinary type of corn planter. In carrying out the invention I attach an elevated frame 7 to the frame 6, through the medium of two supports such as those indicated at 8 and 9.

Any suitable way may be resorted to for supporting the frame 7 with respect to the frame 6. Many ways of accomplishing this result will readily suggest themselves to those skilled in the art. Pivoted upon a bolt 10 at the forward portion of the frame 7, is a vibrator yoke 11, the side arms of which are slotted as indicated at 12 (see Fig. 6), said slotted portions of the yoke engaging the stub shaft 13 which constitutes the axle of a check indicator wheel 14 of large diameter. This check indicator wheel carries lugs 15 upon its periphery which serve to indent and mark the ground as said wheel rotates, while spikes 15ª insure against slipping of said wheel. The wheel 14 lies within a space between side members 7ª and 7ᵇ of the frame 7 and these side members are vertically channeled as indicated at 15 for the reception of the ends of the stub shaft or axle. Thus the wheel may move vertically but will be held against undue vibration or twisting out of alignment by the floating vibrator yoke 11. During the rotation of the wheel 14, its spokes 14ª successively contact with an upper trip arm 17 upon a perpendicular trip shaft 18, said shaft being pivoted at 19 in a bracket 20 of the frame 7. A lower trip arm 21 is slotted for the reception of an upstanding pin 22 upon a rock shaft 23. This rock shaft is the usual and conventional rock shaft employed for actuating the upper seed valve commonly employed in corn planters. Rock shaft 23 carries a trip arm 24 that is connected by a rod or link 25 with a pivoted lever 26. The upper end of this lever is connected by a rod or wire 27 with a bell crank lever 28. Lever 28 is actuated in one direction by a spring 29 and is connected by a link 30 with a valve plate 31 that is pivotally mounted at 32 in the lower end of a hoe 33.

For purposes of illustration I have indicated the machine as comprising two seed hoppers 34 of a conventional form and two of the hoes 33, but it is to be understood that I may employ as many hoppers and as many hoes, to plant as many rows, as may be desired.

A sprocket mechanism 36 of conventional form drives the transverse shaft 27 that is commonly employed for actuating the feed mechanism of the seed hoppers. This structure forms no part of the present invention and is of usual and well known construction.

The several hoes 33 are carried by arms 37 which are pivotally connected at 38 to a transverse member 39 of the frame 7. Thus these hoes may individually rise and fall to compensate for inequalities in the ground. Each hoe carries an upwardly extending chute 40, the fronts of said chutes being vertically slotted as indicated at 41 to receive the spouts 42 which extend from the seed hoppers.

The seed discharged from the conventional seed valves of the hoppers, passes through the spout 42 and falls through the chute 40 into the hoes 33 where it remains upon the valve plates 31 until said valve plates are lifted against the tension springs 29 by the rocking shaft 23. After shaft 23 has been actuated by the spoke of the check indicator wheel striking against the upper trip arm 17, it is returned to normal position by the action of the spring 23′.

A cord or cable 45, which is accessible from the driver's seat 46, passes over a guide 47 and is engaged with the yoke 11. By drawing upon this cable, the driver may lift the check indicator wheel 14 entirely off of the ground when making turns at the ends of the rows.

In the check row corn planters with which I am familiar, the shoes and frames are rigidly connected with respect to each other and it is impossible to properly plant seed in uneven ground, with machines of this character.

If three seed hoppers and associated parts were used in machines of this sort and the two outside shoes should strike high ground, the center shoe would be above ground and drop corn on top of the ground. If the center shoe comes upon a ridge, then the two outside shoes would plant on top of the ground. In the present construction each hoe is, in substance, floatingly mounted so that it will adjust itself to the particular contour of the ground over which it is passing. To insure that the vibrator hoes will remain in proper engagement with the ground, springs 50 are disposed between said hoes and a transverse member 51 of the frame 7, said springs encircling pivoted rods 52 which are secured to the arms 37 of the hoes and pass through the transverse member 51. While I have stated that I contemplate employing any suitable number of hoppers and associated parts, I consider the three hopper machine as being the most practical.

It will be observed that the construction described permits the hoes to move up and down while at the same time maintaining proper communication between the spouts 42 and the chutes 40. To insure that these parts will be held in proper relation to each other, the upper ends of chutes 40 are passed through ring like members 51, which project from the rear side of the frame 7. Any suitable means may be provided for elevating the hoes, one such means comprising a wire or cable 53, one end of which is attached to the operating lever 54 of conventional form. The wire or cable passes over a guide pulley 55 mounted upon frame 7. The structure just described is duplicated for each hoe though the operating lever 54 is common to both hoes and the wires 53 leading from said hoes are attached to said lever.

It is to be understood that the invention is not limited to the precise construction set forth but that it includes within its purview whatever changes fairly come within either the terms or the spirit of the appended claim.

Having described my invention, what I claim is:

The combination with a wheel supported frame and hopper mechanism thereon, of a yoke comprising a pair of spaced arms pivoted at its forward end to said frame and being free for vertical movement at its rear end, said arms being provided adjacent their rear ends with aligned longitudinally extending slots, a spiked ground engaging wheel of relatively large diameter having an axle extending through the slots of said arms, vertical guideways secured to the frame outwardly of the yoke in which the ends of the axle are free to move vertically, a trip mechanism for the hoppers actuated by the spoke of the wheel and an operating means for raising and lowering the wheel, said operating means being accessible from the driver's seat.

In testimony whereof I affix my signature.

JOHN W. GROSS.